(12) United States Patent  
Carro

(10) Patent No.: US 6,580,909 B1
(45) Date of Patent: Jun. 17, 2003

(54) COMMUNICATIONS SYSTEM AND METHOD BASED ON THE RELATIVE POSITIONS OF MOBILE UNITS

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 09/634,390

(22) Filed: Aug. 9, 2000

(30) Foreign Application Priority Data

Aug. 26, 1999 (EP) .............................. 99480082

(51) Int. Cl.[7] .................................. H04Q 7/20
(52) U.S. Cl. ........................ 455/435; 455/450
(58) Field of Search ................. 455/435, 11.1, 455/7, 433, 31.2, 509, 512, 514, 519, 557, 550, 563, 524, 450

(56) References Cited

U.S. PATENT DOCUMENTS 5,412,654 A * 5/1995 Perkins ..................... 370/312
5,790,938 A * 8/1998 Talarmo .................... 455/11.1
5,910,947 A * 6/1999 Futamura ................... 370/332
6,108,551 A * 8/2000 Lehmusto et al. .......... 455/450
6,163,680 A * 12/2000 Bridle et al. ............. 340/825.2

* cited by examiner

Primary Examiner—Nguyen T. Vo
Assistant Examiner—Nghi H. Ly
(74) Attorney, Agent, or Firm—Winstead Sechrest & Minich

(57) ABSTRACT

A system and method of forming a network, out of a plurality of mobile communications units sharing a common transmission medium without requiring a base station, are disclosed. Each unit is assumed to have provision for self asserting its own position and has facility for two-way communicating with the other mobile communications units. The method allows that any two mobile communications units, participating in the network i.e., registered to it, eventually acquire the capability of communicating even though the units are not capable of communicating directly e.g., because of the distance between them. Hence, they gain the capability of communicating indirectly through intermediate units of the network acting as relays.

60 Claims, 10 Drawing Sheets

COMMUNICATIONS SYSTEM AND METHOD BASED ON THE RELATIVE POSITIONS OF MOBILE UNITS

FIELD OF THE INVENTION

The present invention relates generally to the field of mobile wireless data communications and, more particularly, to a communications system where each communications unit is capable of determining its own geographic location e.g., from the Global Positioning System (GPS) of satellites, and forming with other units a stand-alone baseless network.

BACKGROUND OF THE INVENTION

There are many types of systems where a plurality of mobile units geographically dispersed must all communicate together in a distributed, decentralized form, using a two-way flow of data over a single communications channel. Examples of mobile wireless systems are aircraft location and collision avoidance systems, telemetry and proximity radar systems, dynamic navigation, surveillance and emergency location systems, air combat monitoring systems, traffic alert systems, pilot data systems, multiple vehicle tracking and security systems, fleet control systems, mobile work force systems or location based adaptive radio control systems. In each case no static master-slave relationship exists among those mobile units. On the contrary, they are all functionally equivalent and, generally, the information coming from any one unit is made available and transmitted to all others at some point of time. Because this occurs on a common shared communications channel, as the number of units that try to access this common channel increases and they are more and more used, the time left to each of them may dramatically be impacted up to a point where messages transmitted by several units collide. Beyond this point probability of transmission collisions dramatically increases since units experiencing collisions all try to retransmit. This may reach a point where no communication becomes possible. Therefore, in such systems, it is of the utmost importance that the common communications channel implement some kind of "distributed" or "universal" channel coordination or control mechanism aimed at preventing transmissions collision while it remains equally important that the common communications channel be used as efficiently as possible so as it can be shared between many users.

Also, a wireless communications environment is characterized by high error rates and by large variations on the signal propagation conditions over time and position. Parameters like distance, weather, radio shadow and multi-path propagation may dramatically affect the transmission conditions. Increasing the power of the transmitters to overcome this is limited in practice, because is mobile units means are generally portable units with limited battery capacity and safety regulations limiting maximum allowed Radio Frequency (RF) signals strength from transmitters. Thus, there is a maximum range for reliable reception of the information transmitted by distant units which practically limits the possibility that the information transmitted from any one unit can correctly be received directly by all the others. Therefore, in such systems, it is also of the utmost importance that each one of the mobile units, receiving a signal from any other unit, can also play the role of a regenerator or relay, thus eventually allowing to deliver reliable information originated from a set of units to other sets that cannot otherwise communicate directly.

Actually, methods have been proposed for enabling data communications over a fleet of mobile units. For example, U.S. Pat. No. 5,153,836, entitled "Universal Dynamic Navigation, Surveillance, Emergency Location, and Collision Avoidance System and Method," teaches how each craft must broadcast its position, identifying information and other messages on a regular basis, without having to be solicited, while preventing conflicts with any radio frequency signals possibly present in the airspace. Similarly, U.S. Pat. No. 4,835,537, entitled "Telemetry Burst Collision Avoidance System," describes a system where each vehicle repeatedly broadcasts its current position and uses carrier detection to prevent transmitting when another station is active. Also, U.S. Pat. No. 4,197,538, entitled "Pilot's Traffic Monitoring System," teaches how, with respect to a given aircraft, position and altitude of all other air craft are received while aircraft position and altitude is transmitted by an onboard FM transceiver multiplexer operated within a transmit-receive duty cycle and providing for transmission collisions. U.S. Pat. No. 5,907,293, entitled "System for Displaying the Characteristics, Position, Velocity and Acceleration of Nearby Vehicles on a Moving-map," uses a GPS receiver to determine a vehicle position with respect to fixed positioned radars at blind intersections, determining other vehicle positions and broadcasting vehicle location information for vehicles lacking a means to track their own location, and acknowledges that broadcast messages could possibly collide. U.S. Pat. No. 5,872,526, entitled "GPS Collision Avoidance System," describes how crafts equipped with GPS receivers are broadcasting their current location to other vehicles while vehicles not equipped with GPS are receiving location information from common ground equipment broadcasted to all vehicles and also acknowledges that transmission collisions occur.

A different approach for controlling transmissions in a distributed mobile environment is that of U.S. Pat. No. 5,367,524, entitled "Method for Sequential Data Transmission," whereby using accurate GPS clock signals as an external clock, a communications system determines a cycle time and duration of time slots such that each communications unit is allocated a time slot for data transmission. This approach eliminates the need for polling the communications units and reduces substantially data congestion, but requires some Time Division Multiplex (TDM) master controller to allocate different time slots to different units. A similar communications control approach is proposed in U.S. Pat. No. 5,587,904, entitled "Air Combat Monitoring System and Methods and Apparatus Useful Therefor," where information dissemination among a plurality of aircraft is performed by employing GPS signals for synchronizing transmitters and uses TDM for communicating among the aircrafts.

Yet another approach is that of U.S. Pat. No. 5,636,123, entitled "Traffic Alert and Collision Avoidance Coding System," that describes a traffic alert and collision avoidance system where the airspace is divided into a grid of volume elements, each of which is assigned a unique pseudo noise (PN) code and where a vehicle determines its position by means of a GPS receiver and places it within one of the volume elements in the airspace. The message to transmit is then generated by modulating a carrier signal with the PN code representing the volume element containing the transmitting vehicle and with the navigation message being then transmitted on a common communications channel using time-multiplexing based on a pseudo random sequence; each receiving vehicle only tracks collision avoidance signals produced by vehicles located in its own and surrounding volume elements.

Still another different approach corresponds to U.S. Pat. No. 4,380,050, entitled "Aircraft Location and Collision Avoidance System," which describes a system where the azimuth and range information of an aircraft with respect to a common ground reference is made available to other aircraft by transmission of a pulse at a time uniquely associated with the aircraft's location so that the collision of the pulses transmitted by air crafts from different locations is impossible, although the method is limited to proximity detection, not enabling transmission of other relevant information, like speed, heading or craft identification. In part based on the same principle, U.S. Pat. No. 5,450,329, entitled "Vehicle Location Method and System," the time slot in which the data message is transmitted is uniquely assigned to each transmitting vehicle as a function of its position, determined by means of a GPS receiver or alike system, in a cartographic grid segment with respect to a reference point assigned to that grid segment. Although this method avoids transmission collisions its main drawback is that much bandwidth is wasted because there are reserved time slots for all grid segments even though not all have transmitters.

Finally, methods have been proposed aimed at controlling mobile units depending on their positions. An example is U.S. Pat. No. 5,442,805, entitled "Location-based Adaptive Radio Control," which describes a method and apparatus for a radio having adjustable operating parameters such as transmitting power, operating channel, operating band, modulation type, etc. based on the unit's current location. In the same line, U.S. Pat. No. 5,635,940, entitled "Communication Configurator and Method for Implementing Same" and U.S. Pat. No. 5,794,151, entitled "Frequency Allocation for Shared Spectrum Transmitter Based on Location," describe similar methods where, depending on the location of the mobile unit, a different communications channel or frequency is configured using configuration data stored with the digital equipment. U.S. Pat. No. 5,355,511, entitled "Position Monitoring for Communicable and Incommunicable Mobile Stations," describes a system and method comprising an order station and a plurality of mobile stations. When the order station cannot communicate with a mobile station, the order station selects one mobile station which is nearest to the incommunicable mobile station and orders the selected mobile station to communicate with the incommunicable mobile station.

SUMMARY OF THE INVENTION

It is a purpose of the present invention to improve the art which can be apprehended from the above review. The present invention enables a plurality of mobile communications units, which may have to operate on large geographic distances, to communicate between them however, neither requiring a base or central station nor a universal master clock to coordinate the access to the common communications channel shared by the mobile units while maximizing the area over which communications are possible.

One aspect of the present invention is to permit bi-directional, one-to-one and one-to-many communications among a fleet of geographically spread mobile units capable of self asserting their geographic location.

The invention further allows a collision-free access of the mobile units to the common communications channel, neither requiring a central station to coordinate the exchanges nor the knowledge of a precise clock reference.

The invention makes possible that two or more mobile units, which cannot communicate directly, may communicate indirectly through other communications units belonging to the fleet of mobile units.

The invention allows transmitting the geographic locations of each communications unit to all others so as to establish a topology and determine the best paths between individual units that cannot communicate directly.

Each unit of the invention uses the topology information to tailor the transmission and reception settings so as to obtain the best possible communication between any two units.

This invention provides a system and method of forming a network, out of a plurality of mobile communications units sharing a common transmission medium without requiring a base station. Each unit is assumed to have provision for self asserting its own position and has facility for two-way communicating with the other mobile communications units. The method allows any two mobile communications units participating in the network to eventually acquire the capability of communicating even though they are not all capable of communicating directly. The initial step of the method assume that each new mobile communications unit needs to register to participate in the network. To do so, each unit not yet registered to a network broadcasts registration commands e.g., at random intervals. When such a registration command is captured by at least one other mobile communications unit registration data provided by said new mobile communications unit is recorded. Registration data includes at least the unique unit identifier of the new mobile communications unit and its current location. This is acknowledged to the new mobile communications unit which, being registered, stops broadcasting registration commands.

Then, each registered mobile communications unit establishes for the first time, or updates a polling sequence, encompassing all the mobile communications units registered to the network. A polling command is formatted, which includes the polling sequence, so that only one at a time of the registered mobile communications units is authorized to issue the polling command in the polling sequence. Finally, the polling command is issued to the next in sequence of said mobile communications units specified in said polling sequence. When the next unit captures the polling command, it is granted in turn, the permission to repeat the above steps thus moving forwards though the polling sequence of registered units.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
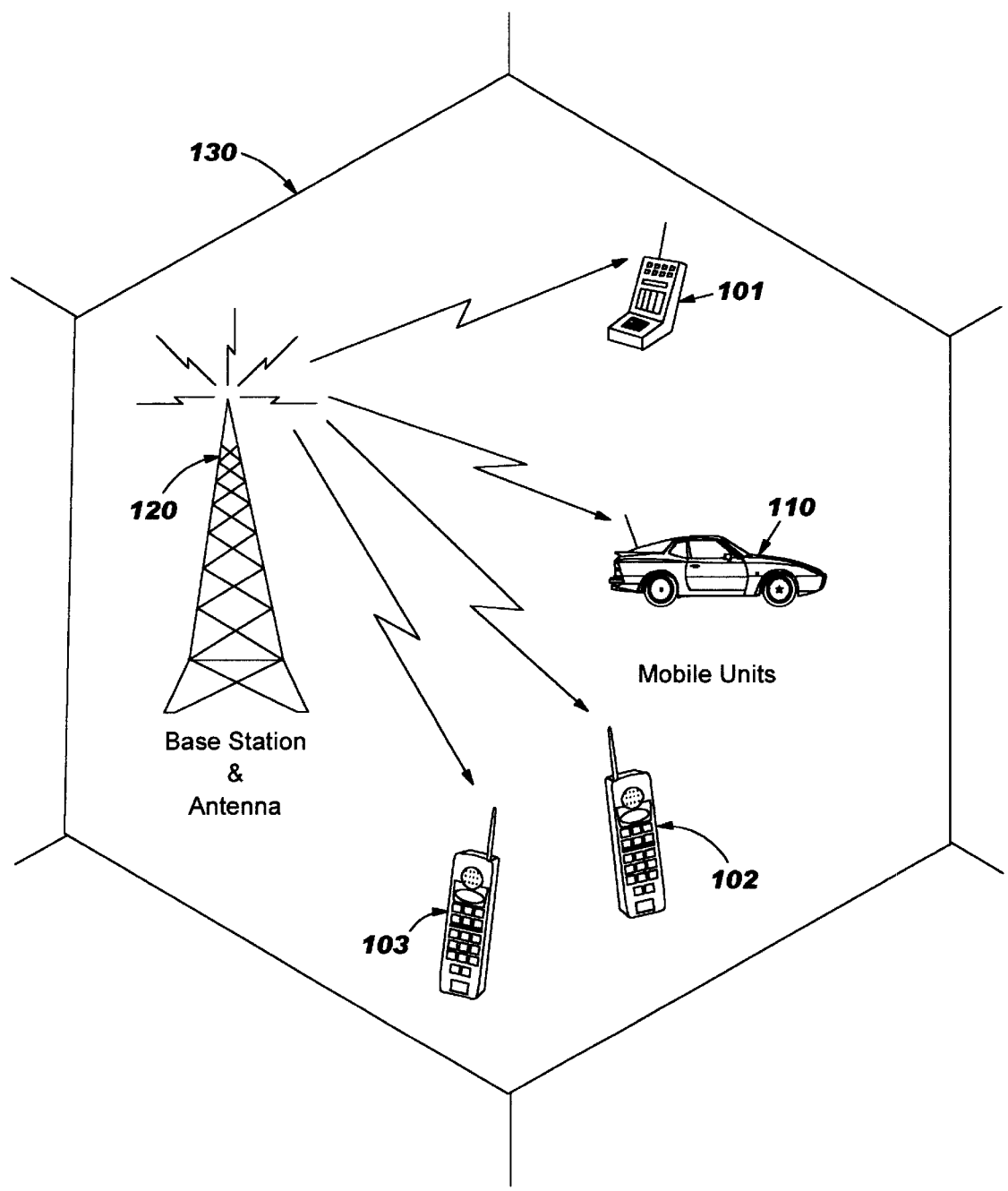
FIG. 1 illustrates prior art where mobile communications units are communicating through a base station.

FIG. 1 illustrates a prior art wireless communications system where a fleet of portable communications units 101, 102 and 103 along with other mobile units 110 may intercommunicate through a base station and antenna 120 provided they are within the boundaries of a cell, 130 i.e., a limited geographic area where all mobile units are normally guaranteed to be reachable directly from the base station 120 or a relay of the base station 120. Also, the system provides for communication between cells similar to cell 130 and to standard wired systems so as all end-users are possibly linked irrespective of their locations and means to access it. Although FIG. 1 is illustrated with voice telephone communications units, it must be understood that the same idea applies also to data communications cells where wireless workstations may all interconnect through a base station 120 forming a wireless Local Area Network (LAN). Thus, in such a system no peer to peer communication is foreseen. Even if two mobile units 102 and 103 are close to each other, they have to communicate through the base station 120. Such systems hinge on the deployment of enough cells and base stations to cover completely an area of interest e.g., a nation.

Figure 2:
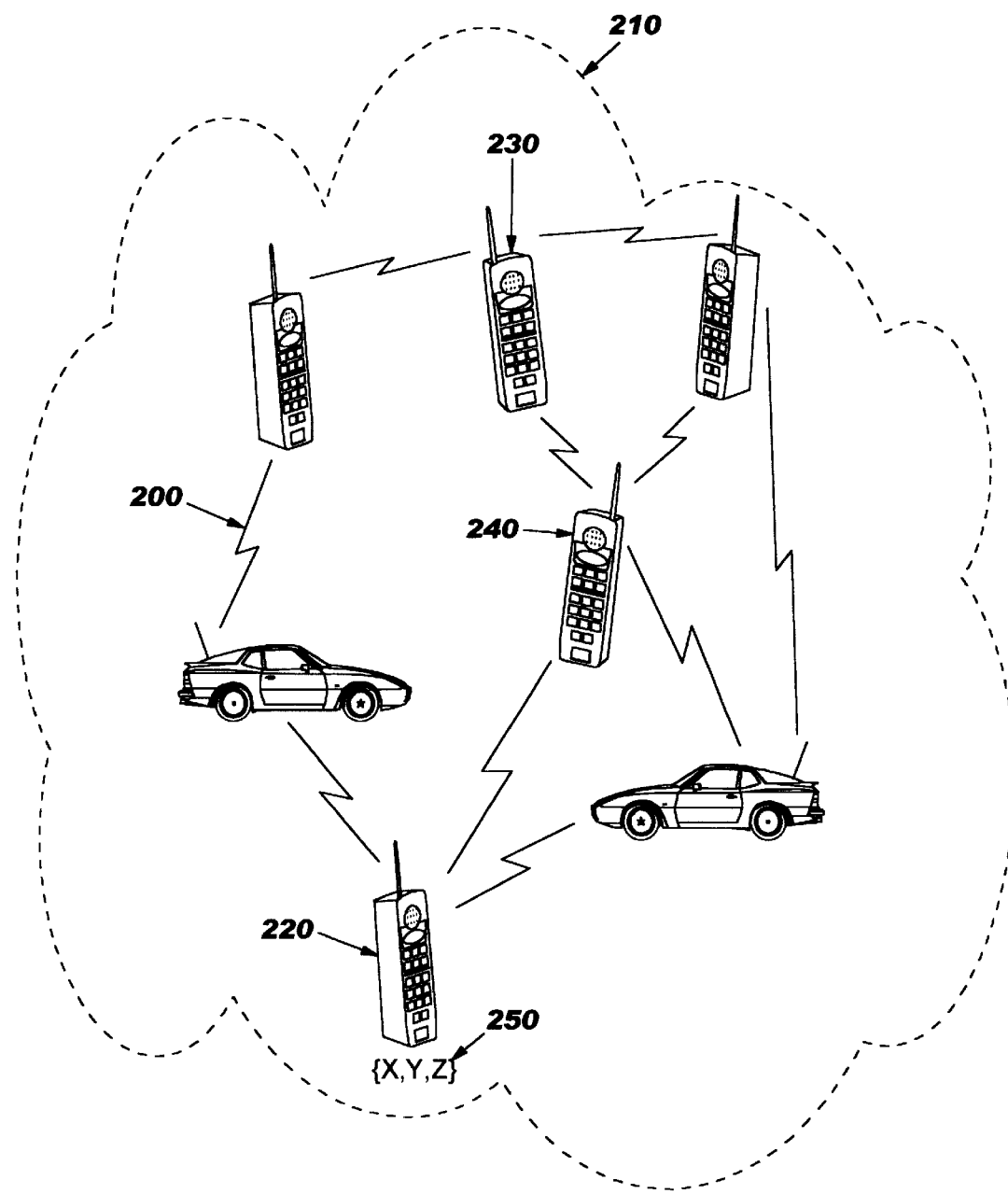
FIG. 2 illustrates where mobile communications units form a meshed network.

FIG. 2 broadly illustrates the frame of the invention which assumes that peer-to-peer wireless communications 200 are enabled between units so that a fleet of mobile units can form a meshed network 210 that does not require any base station to operate. Such a wireless network 210 does not necessarily assume that all mobile units are actually able to establish peer-to-peer communications. In the particular example of FIG. 2 units 220 and 230 are not able to communicate directly e.g., because of the distance between the units. Nevertheless, they are able to establish communications, e.g., through unit 240 acting as a relay between them.

Moreover, a key assumption of the invention is that each individual mobile unit is able to constantly self assert its own geographic position 250, thanks to any system known from the art such as the well-known GPS (Global Positioning System) based on signals received from satellites (not shown) which not only permit determining a precise two-dimension position on earth but also altitude. Then, this information is progressively propagated from mobile units to mobile units within the network 210 so that a map of it can be established which is eventually known of every unit participating into the network 210.

Figure 3:
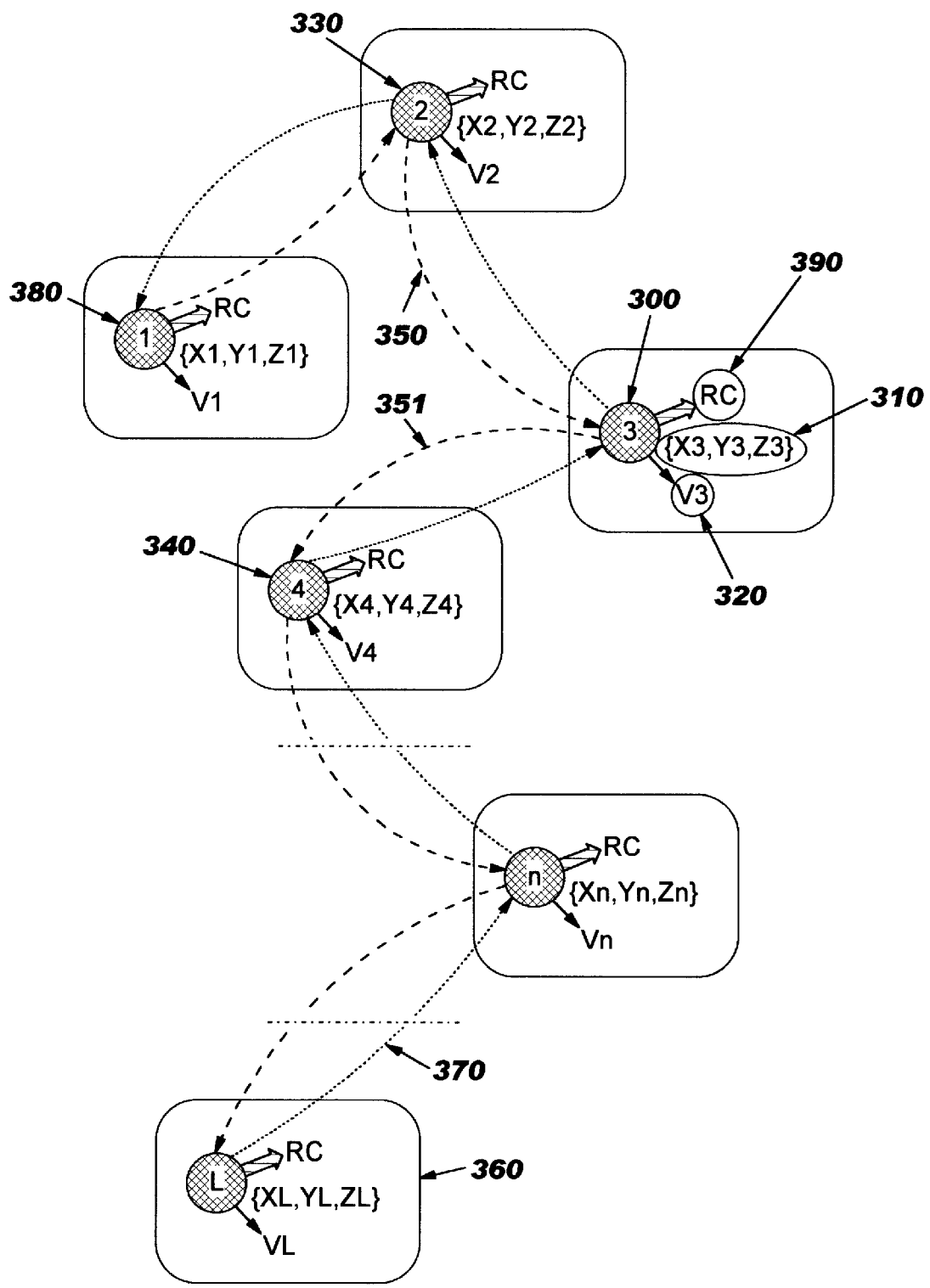
FIG. 3 shows a polling sequence per the invention.

FIG. 3 further illustrates concepts in accordance with the present invention. Each mobile unit participating into the network has a unique identifier i, here shown under the form of a simple number, such as 1, 2, 3, . . . , n . . . , L (see e.g., identifier 300). As already stated previously, each unit has provision (e.g., a GPS receiver) to determine its own position calculated and stored in any appropriate system of universal coordinates and simply pictured here under the form of a triplet of numbers (Xi, Yi, Zi) 310 associated with each mobile unit. Again, this information may be acquired from known systems, not limited to GPS, and may include the Global Navigation Satellite System (GLONASS) and other navigation aids. If appropriate, for the kind of mobile units considered, other navigational information may also be taken into consideration. Among them, parameters such as roll, pitch, yaw and speed vectors symbolized here under the form of a generic vector Vi 320 may also be transmitted.

FIG. 3 illustrates a communications method of the present invention that consists in a "message passing mechanism" operating so that, at any given moment, only one unit (i), for example 300, can receive a polling command (PC) 350, carrying the permission to transmit, from the previous one in sequence (i−1) 330. Then, in turn, unit (i) 300 passes, in a similar polling command 351, permission to the next one in sequence (i+1) 340. This goes on until all units of the chain complete a reception-transmission cycle. When the last unit 360 of the chain is reached, a new communication cycle is triggered, for example, by reversing the polling sequence 370 so that all units are gone through again, in reverse order, up to the first unit 380 and so on. An opportunity is offered at each step of the polling sequence to reassess the sequence. Before actually sending the polling command to the next unit in sequence, the current unit, i.e., the one which holds currently the permission to transmit, broadcasts a registration command (RC) 390 so as to permit the registration of a new mobile unit, not yet participating into the network, that would have come close to it. Also, knowing its own position and the last known positions of the units remaining to poll the current unit may decide to poll in a different order if more appropriate because of new relative positions of the mobile units.

FIG. 4 depicts, through examples, steps allowing form of a network of wireless mobile communications units in accordance with the present invention.

Figure 4A:
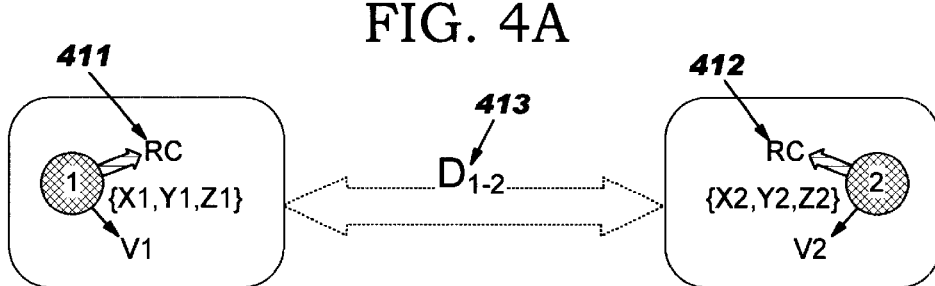
FIG. 4 (FIGS. 4(a)–4(h)) illustrates how a network of mobile communications units is formed and changes over time.

FIG. 4(a) shows the initial conditions where two stand alone mobile units 401 and 402 carrying respectively identifiers 1 and 2, are too distant 413 from each other to be able to reliably communicate. At this point, none of them is assumed to be an active participant in a wireless network yet. Thus, both mobile units are in a state where they look for the reception of a registration command (RC) such as 411 and 412 coming from a peer unit. However, if no registration command is actually received, stand-alone units such as 401 and 402 keep broadcasting, at random intervals, their own registration command (RC). As long as the conditions for communicating do not allow to establish a reliable link between 401 and 402 nothing else occurs i.e., both units keep transmitting their own registration waiting for a peer unit to catch it so as the establishment of a reliable communication path may be attempted.

Figure 4B:
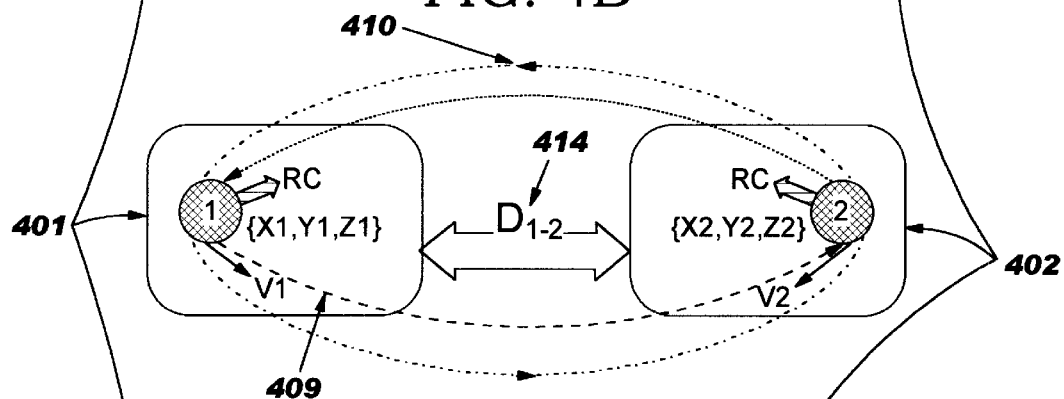

FIG. 4(b) illustrates the case where the registration command (RC) broadcasted by one of the two mobile units, e.g., 401 is reliably received by a peer unit i.e., 402 in this example. If the relative distance 414 and transmission conditions are such that the opposite is true too, a two-way reliable communication becomes possible and following process may then take place. Mobile unit 2 402, which has first received a registration command from unit 1 401, acknowledges it by transmitting a registration response comprising following information:

its identifier (i)

its actual position additional information such as time, speed, . . . etc.

Then, mobile unit 1 401, which is listening, catches the response and stores it all into its memory hence, by this action, registering unit 2 in the network. This is followed by the sending, from mobile unit 1 to mobile unit 2 of a confirmation (ACK) message acknowledging in turn that the information was indeed received and stored. In which case mobile unit 2, knowing it has been registered and is becoming an active player into a network, stops broadcasting at random intervals further registration command and, from that point on, is rather expecting the reception of a polling command 409. Thus, the scheme of the invention, specifically foresees that only non-registered units to any wireless network are permitted to broadcast their registration commands at random intervals. When a mobile unit becomes registered to a wireless network it only transmits its registration command whenever it receives the permission to do so i.e., with the "message passing mechanism" as described in FIG. 3 where all the mobile units pertaining to a wireless are gone through in polling sequence 410 here comprising only the two mobile units 401 and 402.

Figure 4C:
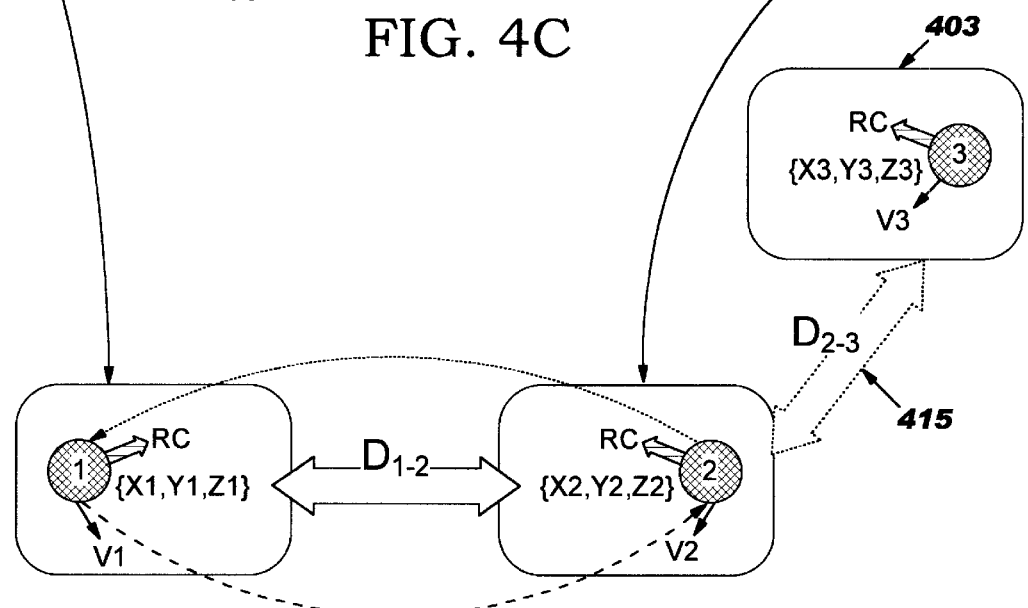

FIG. 4(c) shows the case where a third mobile 403, carrying identifier 3, comes closer to the minimum network formed by mobile units 1 401 and 2 402 previously described however, still too distant 415 to be able to establish a reliable 2-way communication path.

Figure 4D:
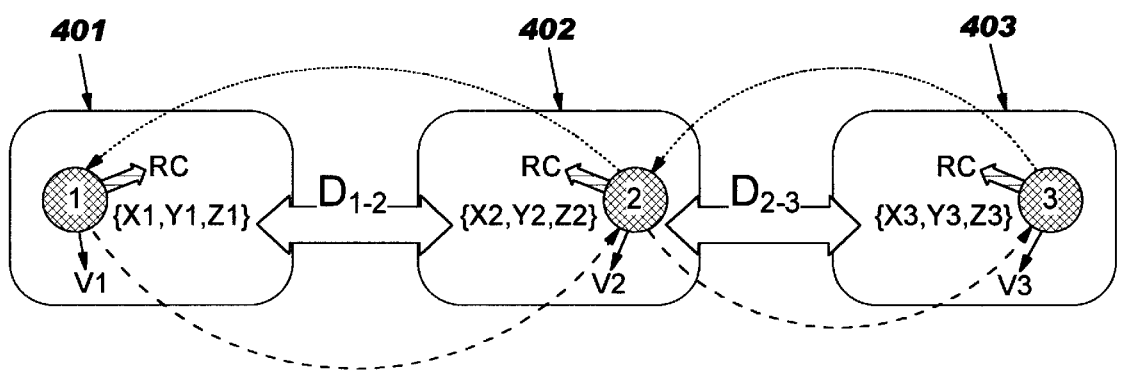

FIG. 4(d) shows the situation after registration of mobile 3 403, in a manner similar to what was described in FIG. 4(c) for units 1 401 and 2 402, has completed. This example assumes that the registration process has taken place between mobile unit 2 402 and mobile unit 3 403 because, during its move towards the minimum wireless network comprising mobile 1 401 and mobile 2 402, it is here assumed that mobile 3 403 has first reached the conditions for establishing a reliable communication path with mobile 2 402. However, should mobile unit 1 401 and mobile unit 3 403 be assumed to become closer, the registration process would have rather taken place, in an exact similar way, between those two latter mobile units instead. Nevertheless, the final result is the same that is, a wireless network of three units is formed. Hence, in the example of this figure the polling sequence, as described in FIG. 3, is going successively through mobile units 1, 2 and 3 then, in reverse order 3, 2, 1 and so on. The polling sequence stays the same as long as the changes in the positions of the mobile units do not affect significantly the transmission conditions. Especially, in the example of this figure it is implicitly assumed that no communication can reliably be established directly between mobile units 1 401 and 3 403.

Figure 4E:
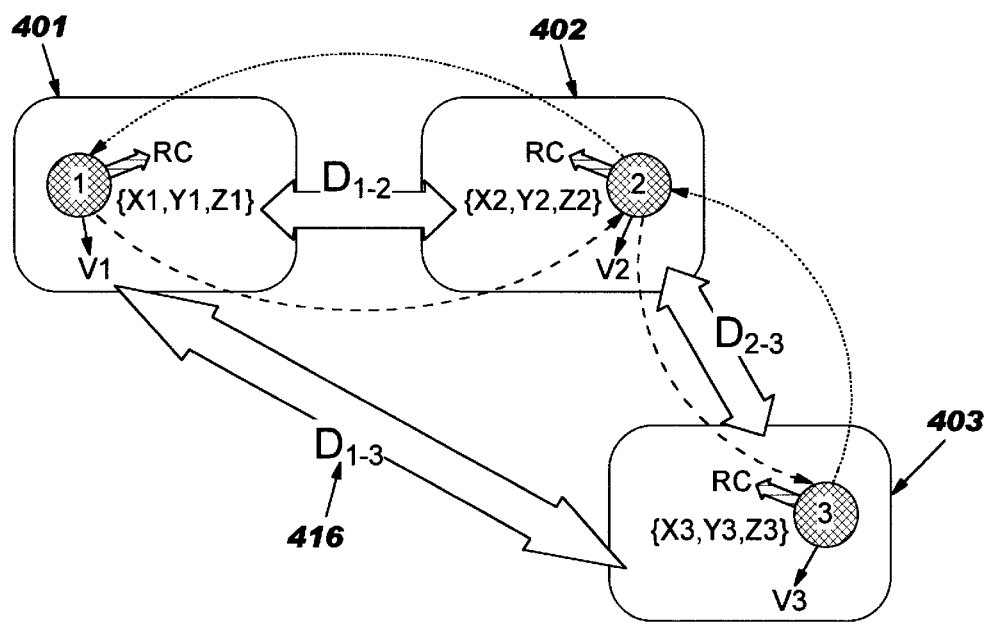

FIG. 4(e) illustrates the case where, on contrary of what is shown in the previous figure, the three mobile units 401, 402 and 403 have moved so that they are becoming close enough to allow a direct communication between any two of them. Especially, mobile units 1 401 and 3 403 may now communicate 416 that is, registration commands and polling commands sent by mobile 3 403 are reliably received by mobile unit 1 401 and vice versa.

Figure 4F:
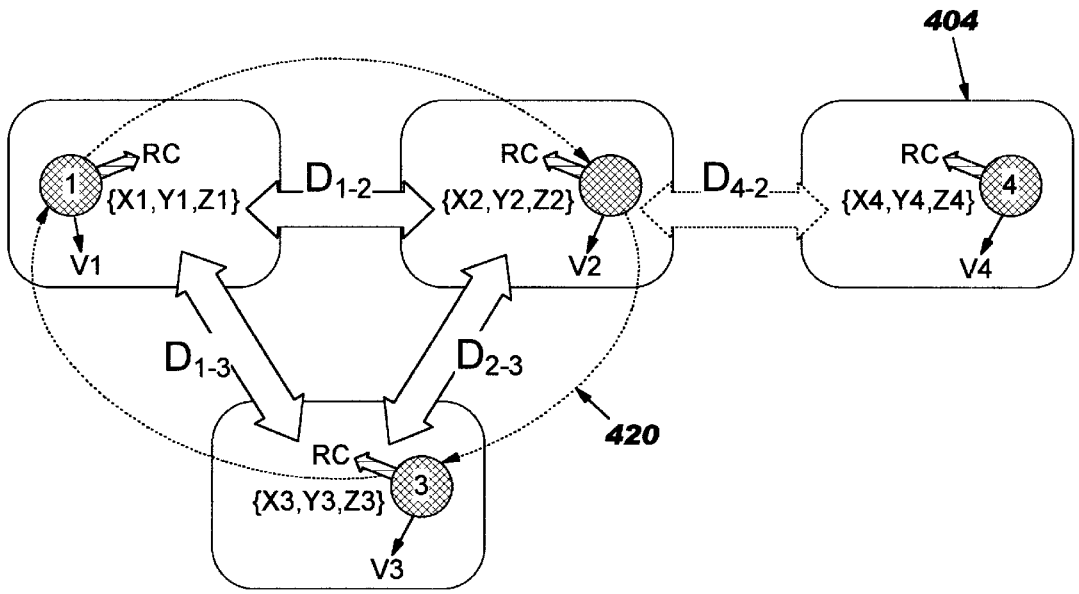

FIG. 4(f) illustrates the consequence of what is discussed in the previous figure when any pair of two mobile units can reliably communicate. Then, the polling sequence is updated so that the serial sequence of previous examples is replaced by a circular sequence 420, cycling over mobile units 1, 2 and 3, better adapted to their relative positions in this configuration. Having an adaptive polling scheme is a feature of the invention which allows the communication parameters to be optimized, taking advantage of the information that each unit has gathered about the actual position of all the others. As an example, the level of power of an emitter in a mobile unit can be adapted to the distance of the other participants it is in direct communication with.

FIG. 4(f) also shows a fourth mobile 4 404 that is approaching the wireless network comprising units 1, 2 and 3 however, still too far for being able to communicate with any of them yet.

Figure 4G:
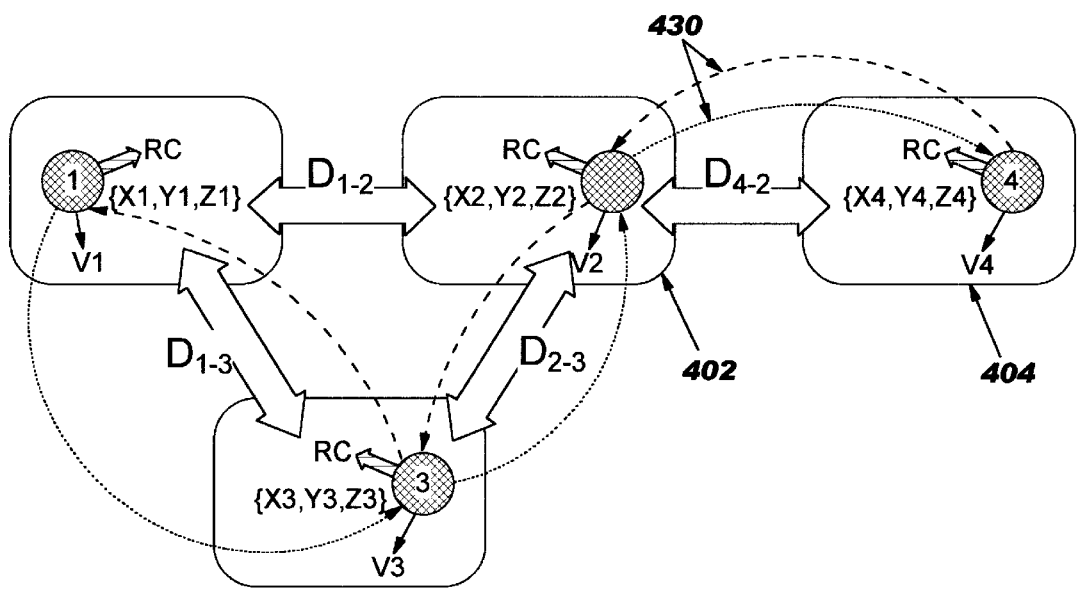

FIG. 4(g) shows the wireless network comprising the four mobiles 1 to 4, after registration of mobile unit 4 404 has taken place in a manner similar to what was described before. In this example, mobile unit 4 404 is assumed to have first been able to establish a reliable two-way communication with mobile unit 2 402. From that point on the polling sequence 430 is adapted again to permit that all mobile units can either communicate directly or through another mobile unit. Thus, the updated polling sequence goes successively through units 1, 3, 2 and 4, then in reverse order, because a reliable 2-way communication is only possible between 2 and 4 but not between 4 and 1 or 3.

Figure 4H:
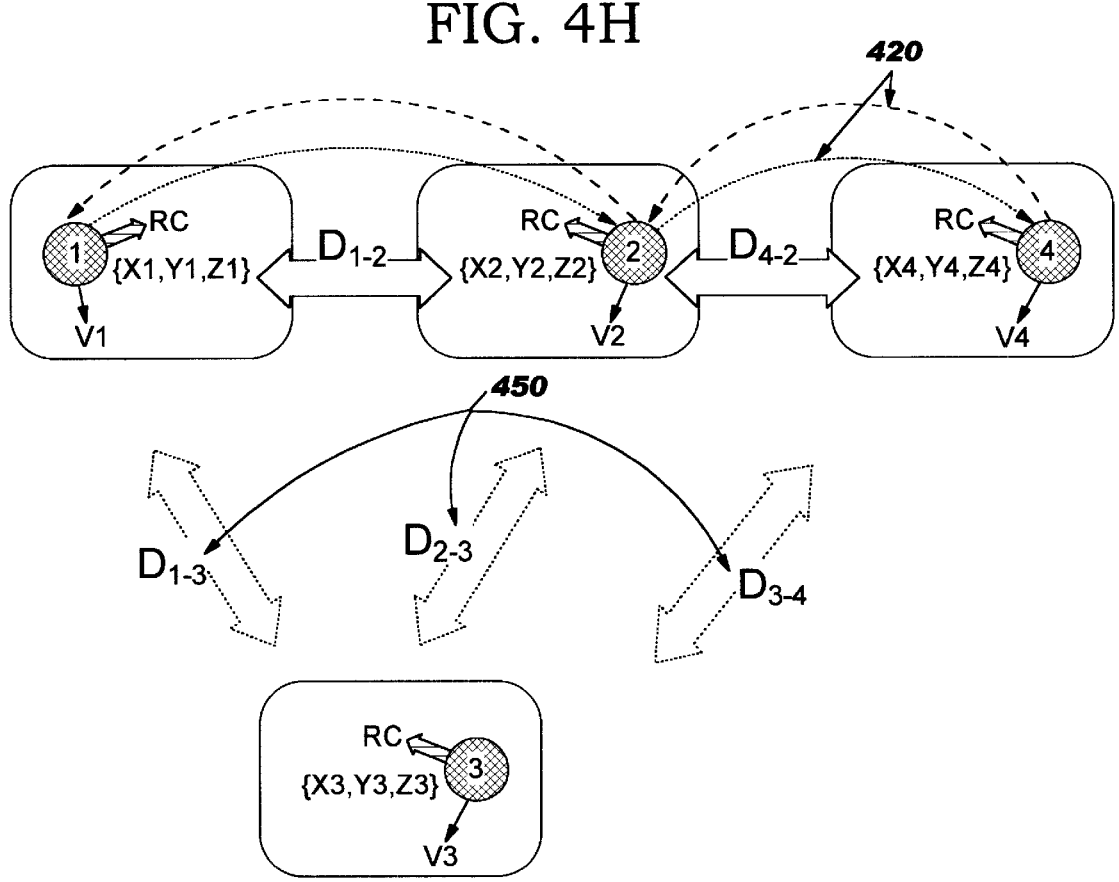

FIG. 4(h) depicts how mobile unit 3 403 must de-register itself from the wireless network when the distance to any one of its participants and the direction of its motion 450 can no longer warrant that a reliable two-way communication will likely remain possible with none of them. De-registration of mobile unit 3 403 from the wireless network eventually triggers again a change of the polling sequence 440 in the wireless network now comprising remaining mobile units 1, 2 and 4. De-registration of a mobile unit, like 403, takes place simply when the mobile unit itself removes its own identification, location and additional information from the polling command (further described in FIG. 5 hereafter) before it transmits, for the last time, to the next in sequence in the current polling sequence. Therefore, all subsequent mobile units are progressively made aware of the fact, while they are polled, that mobile unit 3 403 is no longer part of the wireless network. When this happens, the unit, which has just de-registered, must remain quiet for some time to prevent any short oscillating cycles of successive registration and de-registration that would take place as a result of marginal transmission conditions. In practice, this is achieved by disabling the broadcasting of any registration command by a mobile unit that has just departed a wireless network for some time. Other parameters may have to be considered before transmission of the registration commands may resume such as the distance and the moving direction of the mobile unit with respect to the wireless network it has departed.

Figure 5:
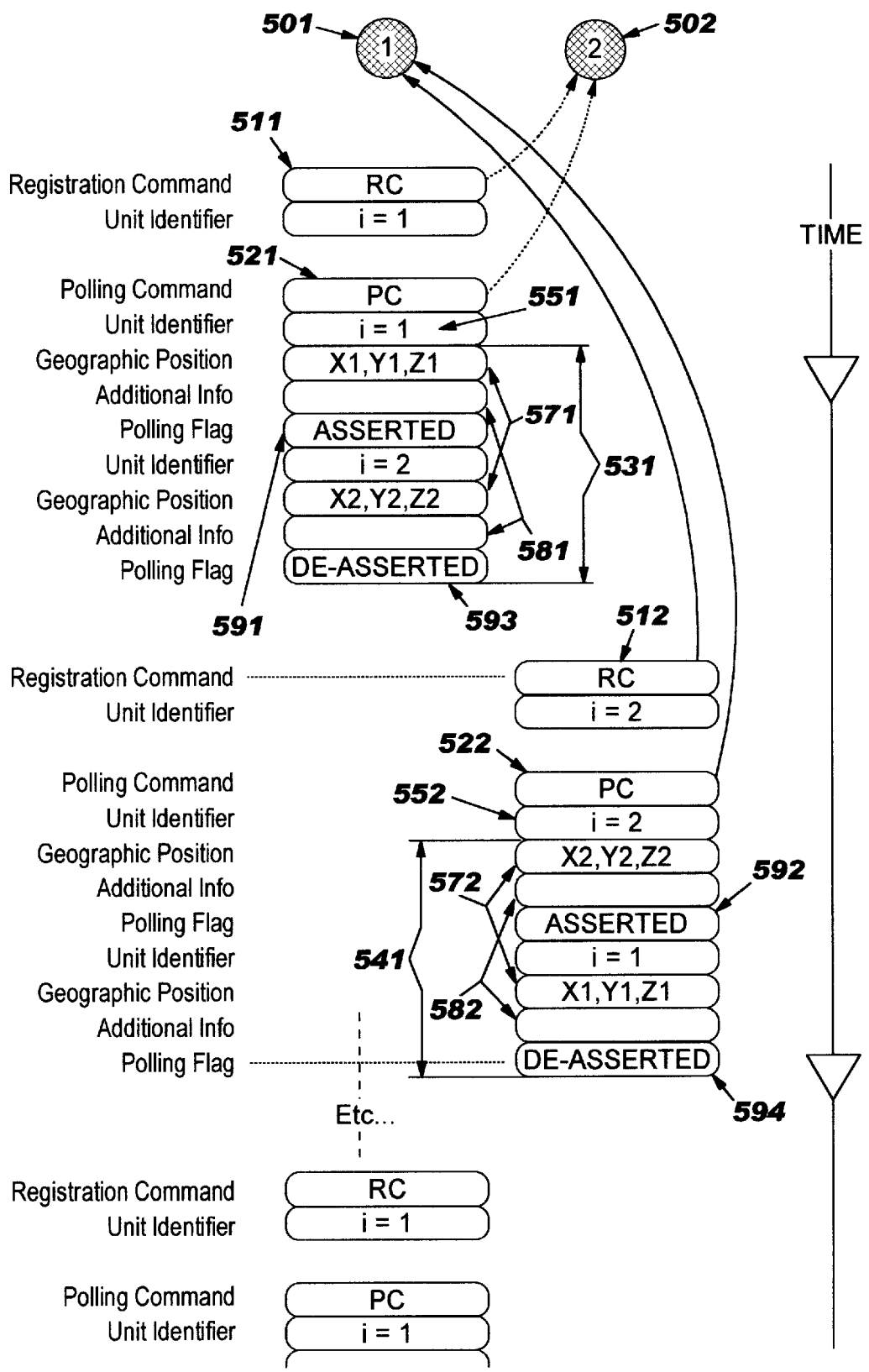
FIG. 5 shows in more detail polling commands.

FIG. 5 shows in more detail the information that is exchanged by the polling commands of a minimum network formed of two units 501 and 502 and the relative timing sequence of the registration commands, i.e., 511 and 512; and the polling commands, i.e., 521 and 522. Each polling command in either unit is formed by concatenating as many records, i.e., 531 and 541 as mobile units that are registered, including the unit issuing the command (i.e., two in this example of a minimum wireless network). Then, each record (one per registered unit) is comprised of the following fields:

a. the mobile unit identifier, i.e., 551 or 552;

b. the last known geographic position of the unit (for the unit issuing the command this is the updated current position as given by the unit own positioning system), i.e., 571 and 572;

c. all other additional information (operational parameters) that may be required to operate the network, i.e., 581 and 582;

d. a binary poll flag, i.e., 591 to 594 which can take the two possible states: asserted or de-asserted. Before sending a new polling command 521, with the actual position and additional information (speed, heading, time, etc.) of the mobile unit, the polling flag of the unit issuing the command is asserted, i.e., 591 and 592 while all the following ones, still to be polled, are de-asserted, i.e., 593 and 594 in this example of a minimum network comprising two mobile units.

In the general case of a wireless network comprising many mobile units, before sending a polling command to the next unit in sequence, the scheme of the invention specifically assumes that various routing and topology algorithms are run which, based on the information gathered from the other mobile units, e.g., their geographic location, may reassess the current polling sequence in an attempt to reach a better overall operational point for the wireless network. Thus, any mobile unit having acquired the right to transmit a polling command may decide to rearrange the polling sequence after the updated information it has collected through the reception of a polling command from its predecessor in the sequence, being further analyzed, allows it to determine that a more efficient sequence is indeed possible. Once a new polling sequence is computed, the records of the unpolled units are reordered thus, forming a new queue of unit records where the first one having a de-asserted polled flag in this queue corresponds to the mobile unit to be addressed next by the polling command.

Figure 6:
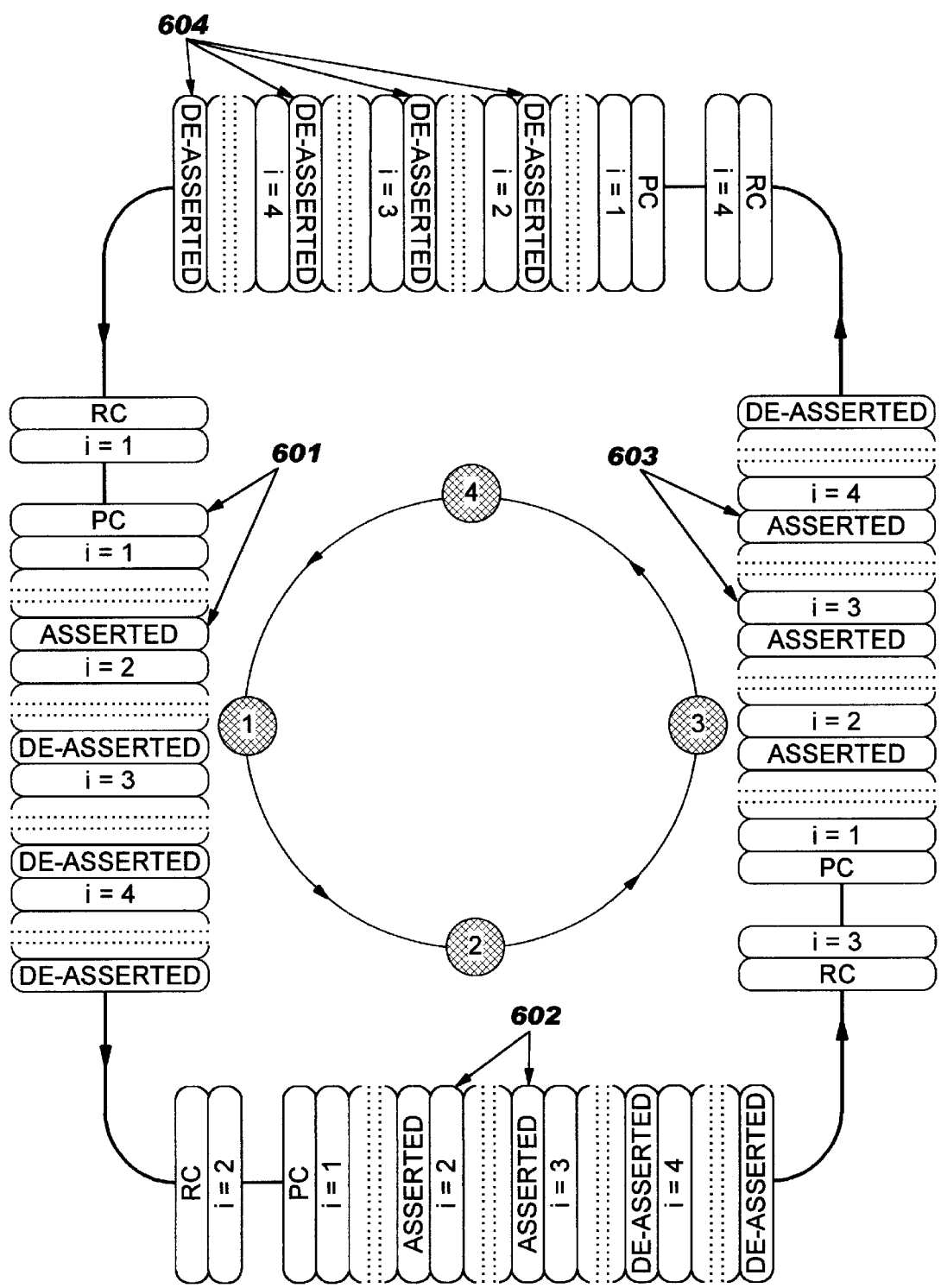
FIG. 6 is an example of a simple circular polling cycle.

FIG. 6 is an overall view of how information is exchanged by the polling commands in a wireless network formed of four mobile units (i=1 to 4) and where a circular polling sequence similar to what is described in FIG. 4(f) is active. The polling sequence of this example assumes, for the sake of simplicity, that mobile units whose identifiers are 1, 2, 3, 4 and 1 again, are successively gone through in this order. However, depending upon the particular sequence in which the mobile units have registered to this wireless network currently comprising four units the order in which the mobile units are actually gone through could obviously be different and depends largely, on one hand, of the history of how this network was formed and, on the other hand, of the transmission conditions observed between mobile devices. For example, it could be advantageous to swap say, mobile units 2 and 3 in this sequence just because the pairs 1,3 and 2,4 are enjoying better transmission conditions. In which case the polling sequence would be 1, 3, 2, 4 and 1 again instead of the one used in this example. Nevertheless, at each step the polling flag corresponding to the mobile unit issuing the command is asserted, e.g., 602 where mobile unit 2 is sending a polling command to mobile unit 3 which in turn will assert the corresponding polling flag 603. This continues until the last mobile unit of the sequence is reached. In such a case, all the polling flags are de-asserted 604 so that the sequence may resume with mobile unit 1 601. Again, the order in which the mobile units are gone through does not depend on the mobile identifier, but is rather adapted to get the best and most economical transmission conditions between the individual mobile units within a fleet of communications devices organized as a wireless network.

Figure 7:
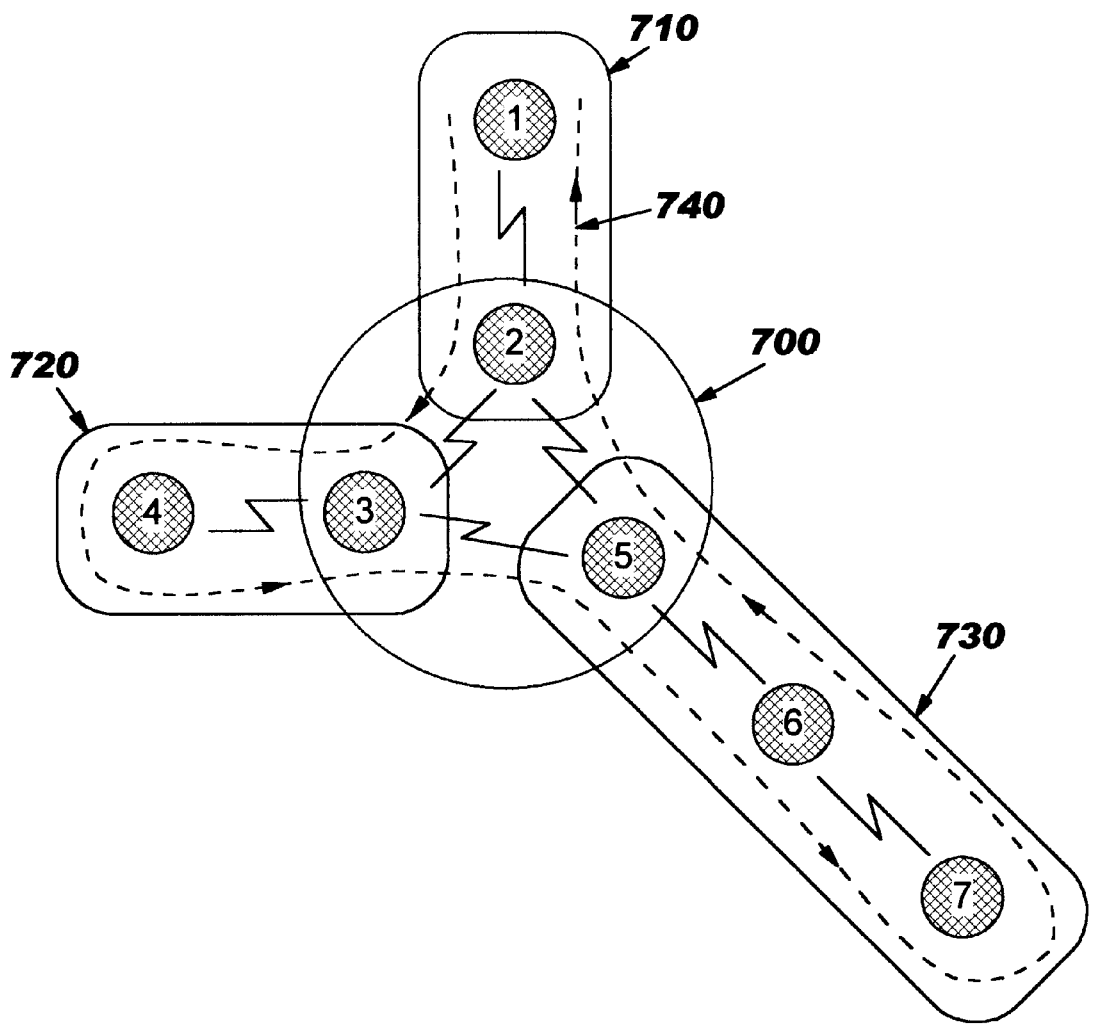
FIG. 7 is another example of a polling cycle.

FIG. 7 briefly illustrates that polling sequences may have to be in practice more complex than the simple ones used to illustrate all other aspects of the invention in the previous figures. Irrespective of their complexity, the simple scheme of the invention still applies. An example of a three-branch network comprising branches 710, 720 and 730 may have to be formed if their only common elements is a sub-network comprising mobile unit 2, 3 and 5 700 in which any two sets of units are capable of communicating while the others at the periphery, i.e., mobile units 1, 4, 6 and 7, cannot. In such a case, a viable polling sequence 740 goes successively through mobile units 1, 2, 3, 4, 3, 5, 6 and 7, during which mobile unit 3 is polled twice. After which, the sequence continues with the polling of units 6, 5, 2 and back to 1, during which mobile unit 2 is gone through a second time.

It should be noted that since all mobile units are equally important (there is no master) a complete polling cycle may start in practice from any unit, provided all units in the wireless network are polled at least once. A first polling cycle could be: 2, 3, 4, 3, 5, 6 and 7 followed by a second (different) polling cycle: 6, 5, 3, 4, 3, 2 and 1. Thus, at the end of a polling cycle (i.e., when all the units have been polled in any order at least once), the last polled unit initiates the following polling cycle. This new polling cycle might terminate in a different unit of the network. Also, changes in topology between two successive polling cycles could result in changing the polling sequence to adapt to a new configuration.

All of this permits the polling to go through all the units participating to this wireless network. Eventually, each unit becomes acquainted with all the other participants even though they are not all able to directly communicate. Therefore, routing and graph algorithms, known from the art, are run within each unit so that all participants are gone through, at least once, during a polling cycle in order that everyone is able to keep track of the movements of all the others.

Although the present invention and its advantages have been described in detail, it should be understood that various changes, substitutions and alterations can be made herein without departing from the spirit and scope of the invention as defined by the appended claims.

What is claimed is:

1. A method of forming a network out of a plurality of mobile communications units sharing a common transmission medium, wherein each unit has provision for self asserting its own position and facility for two-way communicating with other units out of said plurality of mobile communications units, wherein any two mobile communications units eventually acquire a capability of communicating, having an initial step of registering a new mobile communications unit to said network, wherein said step of registering further comprises the steps of:

(a) broadcasting registration commands from each one of said mobile communications units not yet registered;

(b) capturing said registration commands by at least another mobile communications unit out of said plurality of mobile communications units;

(c) recording registration data provided by a new mobile communications unit, said registration data comprising a unique unit identifier of said new mobile communications unit and information describing its current location;

(d) acknowledging to said new mobile communications unit its registration; and (e) stopping the broadcasting of the registration commands by said now registered mobile communications unit.

2. The method according to claim 1 wherein said mobile communications units are wireless mobile communications units.

3. The method according to claim 1 further comprising the step of enabling two-way communications between any two mobile communications units registered to said network, said step of establishing two-way communications comprising the further step of communicating directly, when possible, and indirectly, when not, through other mobile communicating units.

4. The method according to claim 1 wherein each of said registered mobile communications units perform, in turn, the further steps of:

(a) in a first cycle, establishing for a first time, and in subsequent cycles updating a polling sequence, said polling sequence encompassing all said mobile communications units registered to said network;

(b) formatting a polling command containing said polling sequence;

(c) authorizing, through said polling command, only one at a time of said registered mobile communications units to issue said polling command during said polling sequence;

(d) issuing said polling command to next in sequence of said mobile communications units specified in said polling sequence; and (e) capturing said polling command by said next mobile communications unit thus granting it the permission to perform, in turn, all of steps (a)–(e).

5. The method according to claim 4 wherein the step of authorizing only one at a time of said registered mobile communications units to issue said polling command is obtained with the further step of asserting a polling flag for those of said mobile communications already gone through during said polling sequence.

6. The method according to claim 4 further comprising the step of enabling two-way communications between any two mobile communications units registered to said network, said step of establishing two-way communications comprising the further step of communicating directly, when possible, and indirectly, when not, through other mobile communicating units.

7. The method according to claim 4 wherein said mobile communications units are wireless mobile communications units.

8. The method according to claim 7 wherein the step of authorizing only one at a time of said registered mobile communications units to issue said polling command is obtained with the further step of asserting a polling flag for those of said mobile communications already gone through during said polling sequence.

9. The method according to claim 4 wherein, for every mobile communications unit registered to said network, said polling command comprises: a unit identifier; a current geographic location; and all other operational parameters.

10. The method according to claim 9 further comprising the step of enabling two-way communications between any two mobile communications units registered to said network, said step of establishing two-way communications comprising the further step of communicating directly, when possible, and indirectly, when not, through other mobile communicating units.

11. The method according to claim 9 wherein the step of authorizing only one at a time of said registered mobile communications units to issue said polling command is obtained with the further step of asserting a polling flag for those of said mobile communications already gone through during said polling sequence.

12. The method according to claim 9 further comprising the step of de-registering a mobile communications unit from said network, said step of de-registering further comprising the step of removing all entries from said polling sequence corresponding to said mobile communications unit having to de-register, said entries comprising: its unit identifier; its geographic location; and all other operational parameters.

13. The method according to claim 9 wherein said mobile communications units are wireless mobile communications units.

14. The method according to claim 13 wherein the step of authorizing only one at a time of said registered mobile communications units to issue said polling command is obtained with the further step of asserting a polling flag for those of said mobile communications already gone through during said polling sequence.

15. The method according to claim 9 wherein the step of in a first cycle, establishing for the first time, and in subsequent cycles, updating, a polling sequence, in each of said mobile communications units, comprises the further steps of:

(a) building or updating a map of said plurality of mobile communications units registered to said network on the basis of their current geographic location;

(b) analyzing all additional operational parameters recorded on said registered mobile communications units to said network; and (c) determining a best path, for said polling sequence, of registered mobile communications units to go through.

16. The method according to claim 15 further comprising the step of enabling two-way communications between any two mobile communications units registered to said network, said step of establishing two-way communications comprising the further step of communicating directly, when possible, and indirectly, when not, through other mobile communicating units.

17. The method according to claim 15 further comprising the step of de-registering a mobile communications unit from said network, said step of de-registering further comprising the step of removing all entries from said polling sequence corresponding to said mobile communications unit having to de-register, said entries comprising: its unit identifier; its geographic location; and, all other operational parameters.

18. The method according to claim 15 wherein the step of authorizing only one at a time of said registered mobile communications units to issue said polling command is obtained with the further step of asserting a polling flag for those of said mobile communications already gone through during said polling sequence.

19. The method according to claim 15 wherein said mobile communications units are wireless mobile communications units.

20. The method according to claim 19 wherein the step of authorizing only one at a time of said registered mobile communications units to issue said polling command is obtained with the further step of asserting a polling flag for those of said mobile communications already gone through during said polling sequence.

21. A network of mobile communications units sharing a common transmission medium, wherein each unit has provision for self asserting its own position and facility for two-way communicating with other units out of said plurality of mobile communications units, wherein any two mobile communications units eventually acquire a capability of communicating, having an initial means for registering a new mobile communications unit to said network, wherein said means for registering further comprises:

(a) means for broadcasting registration commands from each one of said mobile communications units not yet registered;

(b) means for capturing said registration commands by at least another mobile communications unit out of said plurality of mobile communications units;

(c) means for recording registration data provided by a new mobile communications unit, said registration data comprising a unique unit identifier of said new mobile communications unit and information describing its current location;

(d) means for acknowledging to said new mobile communications unit its registration; and (e) means for stopping the broadcasting of the registration commands by said now registered mobile communications unit.

22. The network according to claim 21 wherein said mobile communications units are wireless mobile communications units.

23. The network according to claim 21 further comprising means for enabling two-way communications between any two mobile communications units registered to said network, said means for establishing two-way communications comprising the further means for communicating directly, when possible, and indirectly, when not, through other mobile communicating units.

24. The network according to claim 21 wherein each of said registered mobile communications units further comprise:
(a) in a first cycle, means for establishing for a first time, and in subsequent cycles updating a polling sequence, said polling sequence encompassing all said mobile communications units registered to said network;
(b) means for formatting a polling command containing said polling sequence;
(c) means for authorizing, through said polling command, only one at a time of said registered mobile communications units to issue said polling command during said polling sequence;
(d) means for issuing said polling command to next in sequence of said mobile communications units specified in said polling sequence; and
(e) means for capturing said polling command by said next mobile communications unit.

25. The network according to claim 24 wherein the means for authorizing only one at a time of said registered mobile communications units to issue said polling command is obtained with the further means for asserting a polling flag for those of said mobile communications already gone through during said polling sequence.

26. The network according to claim 24 further comprising means for enabling two-way communications between any two mobile communications units registered to said network, said means for establishing two-way communications comprising the further means for communicating directly, when possible, and indirectly, when not, through other mobile communicating units.

27. The network according to claim 24 wherein said mobile communications units are wireless mobile communications units.

28. The network according to claim 27 Wherein the means for authorizing only one at a time of said registered mobile communications units to issue said polling command is obtained with the further means for asserting a polling flag for those of said mobile communications already gone through during said polling sequence.

29. The network according to claim 24 wherein, for every mobile communications unit registered to said network, said polling command comprises: a unit identifier; a current geographic location; and all other operational parameters.

30. The network according to claim 29 further comprising means for enabling two-way communications between any two mobile communications units registered to said network, said means for establishing two-way communications comprising the further means for communicating directly, when possible, and indirectly, when not, through other mobile communicating units.

31. The network according to claim 29 wherein the means for authorizing only one at a time of said registered mobile communications its to issue said polling command is obtained with the further means for asserting a polling flag for those of said mobile communications already gone through during said polling sequence.

32. The network according to claim 29 further comprising means for de-registering a mobile communications unit from said network, said means for de-registering further comprising means for removing all entries from said polling sequence corresponding to said mobile communications unit having to de-register, said entries comprising: its unit identifier; its geographic location; and all other operational parameters.

33. The network according to claim 29 wherein said mobile communications units are wireless mobile communications units.

34. The network according to claim 33 wherein the means for authorizing only one at a time of said registered mobile communications units to issue said polling command is obtained with the further means for asserting a polling flag for those of said mobile communications already gone through during said polling sequence.

35. The network according to claim 29 wherein the means for establishing for the first time, and in subsequent cycles, updating, a polling sequence, in each of said mobile communications units, comprises:
(a) means for building or updating a map of said plurality of mobile communications units registered to said network on the basis of their current geographic location;
(b) means for analyzing all additional operational parameters recorded on said registered mobile communications units to said network; and
(c) means for determining a best path, for said polling sequence, of registered mobile communications units to go through.

36. The network according to claim 35 further comprising means for enabling two-way communications between any two mobile communications units registered to said network, said means for establishing two-way communications comprising the further means for communicating directly, when possible, and indirectly, when not, through other mobile communicating units.

37. The network according to claim 35 further comprising means for de-registering a mobile communications unit from said network, said means for de-registering further comprising means for removing all entries from said polling sequence corresponding to said mobile communications unit having to de-register, said entries comprising: its unit identifier; its geographic location; and, all other operational parameters.

38. The network according to claim 35 wherein the means for authorizing only one at a time of said registered mobile communications units to issue said polling command is obtained with the further means for asserting a polling flag for those of said mobile communications already gone through during said polling sequence.

39. The network according to claim 35 wherein said mobile communications units are wireless mobile communications units.

40. The network according to claim 39 wherein the means for authorizing only one at a time of said registered mobile communications units to issue said polling command is obtained with the further asserting a polling flag for those of said mobile communications already gone through during said polling sequence.

41. A computer readable medium having stored thereon computer executable instructions for carrying out a network of mobile communications units sharing a common transmission medium, wherein each unit has provision for self asserting its own position and facility for two-way communicating with other units out of said plurality of mobile communications units, wherein any two mobile communications units eventually acquire a capability of communicating, the computer readable medium having an initial programming step of registering a new mobile communications unit to said network, wherein said programming step of registering further comprises the programming steps of:

(a) broadcasting registration commands from each one of said mobile communications units not yet registered;

(b) capturing said registration commands by at least another mobile communications unit out of said plurality of mobile communications units;

(c) recording registration data provided by a new mobile communications unit, said registration data comprising a unique unit identifier of said new mobile communications unit and information describing its current location;

(d) acknowledging to said new mobile communications unit its registration; and (e) stopping the broadcasting of the registration commands by said now registered mobile communications unit.

42. The computer readable medium according to claim 41 wherein said mobile communications units are wireless mobile communications units.

43. The computer readable medium according to claim 41 further comprising the programming step of enabling two-way communications between any two mobile communications units registered to said network, said programming step of establishing two-way communications comprising the further programming step of communicating directly, when possible, and indirectly, when not, through other mobile communicating units.

44. The computer readable medium according to claim 41 wherein each of said registered mobile communications units perform, in turn, the further programming steps of:

(a) in a first cycle, establishing for a first time, and in subsequent cycles updating a polling sequence, said polling sequence encompassing all said mobile communications units registered to said network;

(b) formatting a polling command containing said polling sequence;

(c) authorizing, through said polling command, only one at a time of said registered mobile communications units to issue said polling command during said polling sequence;

(d) issuing said polling command to next in sequence of said mobile communications units specified in said polling sequence; and (e) capturing said polling command by said next mobile communications unit thus granting it the permission to perform, in turn, all of programming steps (a)–(e).

45. The computer readable medium according to claim 44 wherein the programming step of authorizing only one at a time of said registered mobile communications units to issue said polling command is obtained with the further programming step of asserting a polling flag for those of said mobile communications already gone through during said polling sequence.

46. The computer readable medium according to claim 44 further comprising the programming step of enabling two-way communications between any two mobile communications units registered to said network, said programming step of establishing two-way communications comprising the further programming step of communicating directly, when possible, and indirectly, when not, through other mobile communicating units.

47. The computer readable medium according to claim 44 wherein said mobile communications units are wireless mobile communications units.

48. The computer readable medium according to claim 47 wherein the programming step of authorizing only one at a time of said registered mobile communications units to issue said polling command is obtained with the further programming step of asserting a polling flag for those of said mobile communications already gone through during said polling sequence.

49. The computer readable medium according to claim 44 wherein, for every mobile communications unit registered to said network, said polling command comprises: a unit identifier; a current geographic location; and all other operational parameters.

50. The computer readable medium according to claim 49 further comprising the programming step of enabling two-way communications between any two mobile communications units registered to said network, said programming step of establishing two-way communications comprising the further programming step of communicating directly, when possible, and indirectly, when not, through other mobile communicating units.

51. The computer readable medium according to claim 49 wherein the programming step of authorizing only one at a time of said registered mobile communications units to issue said polling command is obtained with the further programming step of asserting a polling flag for those of said mobile communications already gone through during said polling sequence.

52. The computer readable medium according to claim 49 further comprising the programming step of de-registering a mobile communications unit from said network, said programming step of de-registering further comprising the programming step of removing all entries from said polling sequence corresponding to said mobile communications unit having to de-register, said entries comprising: its unit identifier; its geographic location; and all other operational parameters.

53. The computer readable medium according to claim 49 wherein said mobile communications units are wireless mobile communications units.

54. The computer readable medium according to claim 53 wherein the programming step of authorizing only one at a time of said registered mobile communications units to issue said polling command is obtained with the further programming step of asserting a polling flag for those of said mobile communications already gone through during said polling sequence.

55. The computer readable medium according to claim 49 wherein the programming step of in a first cycle, establishing for the first time, and in subsequent cycles, updating, a polling sequence, in each of said mobile communications units, comprises the further programming steps of:

(a) building or updating a map of said plurality of mobile communications units registered to said network on the basis of their current geographic location;

(b) analyzing all additional operational parameters recorded on said registered mobile communications units to said network; and (c) determining a best path, for said polling sequence, of registered mobile communications units to go through.

56. The computer readable medium according to claim 55 further comprising the programming step of enabling two-way communications between any two mobile communications units registered to said network, said programming step of establishing two-way communications comprising the further programming step of communicating directly, when possible, and indirectly, when not, through other mobile communicating units.

57. The computer readable medium according to claim 55 further comprising the programming step of de-registering a mobile communications unit from said network, said programming step of de-registering further comprising the programming step of removing all entries from said polling sequence corresponding to said mobile communications unit having to de-register, said entries comprising: its unit identifier; its geographic location; and, all other operational parameters.

58. The computer readable medium according to claim 55 wherein the programming step of authorizing only one at a time of said registered mobile communications units to issue said polling command is obtained with the further programming step of asserting a polling flag for those of said mobile communications already gone through during said polling sequence.

59. The computer readable medium according to claim 55 wherein said mobile communications units are wireless mobile communications units.

60. The computer readable medium according to claim 59 wherein the programming step of authorizing only one at a time of said registered mobile communications units to issue said polling command is obtained with the further programming step of asserting a polling flag for those of said mobile communications already gone through during said polling sequence.

* * * * *

UNITED STATES PATENT AND TRADEMARK OFFICE
CERTIFICATE OF CORRECTION

PATENT NO. : 6,580,909 B1
APPLICATION NO. : 09/634390
DATED : June 17, 2003
INVENTOR(S) : Fernando Incertis Carro Page 1 of 1

It is certified that error appears in the above-identified patent and that said Letters Patent is hereby corrected as shown below:

Column 13, line 45, change "Wherein" to – wherein –.

Column 13, line 64, change "its" to – units –.

Signed and Sealed this

Fifth Day of September, 2006

JON W. DUDAS
*Director of the United States Patent and Trademark Office*